US007698052B2

(12) United States Patent
Yamada et al.

(10) Patent No.: US 7,698,052 B2
(45) Date of Patent: Apr. 13, 2010

(54) ENGINE ROTATION CONTROL DEVICE AND BOAT

(75) Inventors: Takashi Yamada, Shizuoka (JP); Masaru Kawanishi, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 284 days.

(21) Appl. No.: 12/026,645

(22) Filed: Feb. 6, 2008

(65) Prior Publication Data

US 2008/0215230 A1 Sep. 4, 2008

(30) Foreign Application Priority Data

Feb. 9, 2007 (JP) ............................. 2007-031219
Sep. 18, 2007 (JP) ............................. 2007-240807

(51) Int. Cl.
*G06F 19/00* (2006.01)
*B60L 15/00* (2006.01)
*B63H 21/22* (2006.01)

(52) U.S. Cl. ............................. 701/110; 701/2; 701/21; 701/115; 440/1; 440/87

(58) Field of Classification Search ................. 123/349, 123/350, 352, 361, 399, 400, 403; 701/101-103, 701/110, 115; 440/1, 2, 75, 84, 87
See application file for complete search history.

(56) References Cited

U.S. PATENT DOCUMENTS 4,817,466 A * 4/1989 Kawamura et al. ............ 440/75
5,803,043 A * 9/1998 Bayron et al. ............... 701/110
6,487,983 B1 * 12/2002 Jonsson et al. .......... 114/144 R
6,946,953 B2 * 9/2005 Lesesky et al. .............. 340/431
7,021,283 B2 * 4/2006 Okuyama ................... 123/350
7,286,928 B2 * 10/2007 Spengler ..................... 701/115
7,442,102 B2 * 10/2008 Ito et al. ........................ 440/1
7,530,863 B2 * 5/2009 Ito et al. ........................ 440/1
7,540,793 B2 * 6/2009 Okuyama ...................... 440/1
7,591,697 B2 * 9/2009 Yamada et al. ................. 440/2

FOREIGN PATENT DOCUMENTS

JP 7-22288 B2 3/1995
JP 3797049 B2 7/2006

* cited by examiner

*Primary Examiner*—Willis R Wolfe, Jr.
(74) *Attorney, Agent, or Firm*—Keating & Bennett, LLP

(57) ABSTRACT

In an engine rotation control device, a remote control operation device is provided with a remote control side ECU and an engine side ECU so that an outboard motor can be remotely controlled. The remote control side ECU and the engine side ECU periodically communicate a control signal. A gauge includes a slow-speed operation section that changes the engine rotational speed during slow-speed cruising. The slow-speed operation section outputs a change command signal to change the engine rotational speed, and a rotational speed change signal generated by a signal output section based on the change command signal is transmitted to the engine side ECU as a periodic control signal. A reset section of the remote control side ECU resets the rotational speed change signal to an initial state in response to a request from a reset request section.

12 Claims, 7 Drawing Sheets

ENGINE ROTATION CONTROL DEVICE AND BOAT

BACKGROUND OF THE INVENTION

1. Field of the Invention

The present invention relates to a device for controlling the rotating state of an engine.

2. Description of the Related Art

Conventionally, in a small boat such as a motor boat, a steering device, a shift device and other components are mechanically connected to an engine of an outboard motor. In order to improve the operability of the boat during steering using a communication technology, the communication technologies described in JP-B-Hei 7-22288 and JP-B-3797049 have been used. More specifically, a boat including a remote control device arranged to remotely control an engine is known. The boat includes an engine side ECU (Engine Control Unit) as an "engine side control unit" on the engine side to which a steering wheel device, a gear box and other components of the remote control device are connected via a signal line, such as a wiring harness, and an engine rotation control device arranged to control the rotational speed of the engine by remote control from the remote control device. When trolling is performed using such a boat, the boat must be continuously moved at a slow speed such that the end of the fishing line can be consistently positioned in a region in which fish are present. Thus, the operator moves the boat forward (or backward) slowly by alternating between a state in which the gear is in a forward (or reverse) position and a state in which the gear is in a neutral position for short time periods (this manner of traveling is referred to as "slow-speed cruising" in this specification). To achieve slow-speed cruising by operating the shift lever, the operator must repeatedly shift the remote control shift lever in the cockpit between the forward (or reverse) position and the neutral position in short periods of a few to several dozens seconds, resulting in a burden on the operator. Therefore, it is known to enter the time periods for which the forward (or reverse) gear is to be used and the time periods for which the neutral gear is to be used into programs in advance and to provide an operation button on a gauge for displaying prescribed measured values from the engine so that a desired program can be started by operating the operation button to cause a microcomputer incorporated in the engine side ECU to perform control functions required to achieve a desired slow-speed cruising.

SUMMARY OF THE INVENTION

To overcome the problems described above, preferred embodiments of the present invention provide an engine rotation control device which prevents an excessive load from being exerted on the engine side ECU and which precisely adjusts the rotational speed of the engine during slow-speed cruising.

An engine rotation control device according to a preferred embodiment of the present invention includes a slow-speed operation unit that outputs a change command signal for changing the rotational speed of an engine based on a command input to control the speed during slow-speed cruising, a remote control side control unit provided in a remote control device that remotely controls the engine for outputting a rotational speed change signal for changing the rotational speed of the engine when the change command signal is received, and an engine side control unit provided in the engine that periodically communicates a control signal with the remote control side control unit at regular intervals to change the rotational speed of the engine based on the rotational speed change signal. The remote control side control unit includes a signal output section that outputs the rotational speed change signal, a reset section that resets the output state of the rotational speed change signal in the signal output section to an initial state, and a reset request section that actuates the reset section.

The engine side control unit preferably includes a rotational speed operation section that performs control functions required to change the rotational speed of the engine when a rise or fall of the rotational speed change signal is detected.

The slow-speed operation section is preferably provided on a gauge for displaying prescribed measured values from the engine.

The reset request section is preferably provided in one of the gauge, the remote control side control unit, and the engine side control unit.

The reset request section preferably includes a timer that monitors the output period of the rotational speed change signal, and the reset request section makes a request for the reset when the output period of the rotational speed change signal measured by the timer reaches a predetermined period of time.

The engine side control unit preferably includes a response section that sends out a response signal for indicating the reception of the rotational speed change signal, and the reset request section activates the reset section after receiving the response signal.

Another preferred embodiment of the present invention provides a boat including an engine rotation control device as described above.

The remote control device that remotely controls the engine is provided with the remote control side control unit arranged to output a rotational speed change signal to change the rotational speed of the engine when a change command signal for changing the rotational speed of the engine fed from the slow-speed operation section is received. In addition, the remote control side control unit and the engine side control unit periodically communicate a control signal with each other at regular intervals, and the engine side control unit changes the rotational speed of the engine based on the rotational speed change signal. Therefore, when the rotational speed of the engine is remotely controlled, since the signal processing during slow-speed cruising is performed on the remote control side control unit side first, the load on the engine side control unit is reduced. In addition, since the remote control side control unit includes the signal output section that outputs a rotational speed change signal and the reset section that resets the output state of the rotational speed change signal in the signal output section to an initial state, and since the reset request section activates the reset section, the output and reset of the rotational speed change signal can be controlled properly in accordance with a periodic communication of a control signal between the remote control side control unit and the engine side control unit. As a result, the rotational speed of the engine can be precisely controlled during slow-speed cruising without exerting an excessive load on the engine side ECU.

The rotational speed operation section of the engine side control unit performs control functions required to change the rotational speed of the engine when a rise or fall of the rotational speed change signal is detected. Thus, the rotational speed operation section performs the control functions required to change the rotational speed of the engine only at a time when the rotational speed change signal fed from the remote control side control unit is changed. Therefore, even when the output period of one change command signal extends across a plurality of intervals between periodic communications of a control signal between the remote control side control unit and the engine side control unit, the rotational speed operation section does not incorrectly interpret one change command signal as being a plurality of change command signals. As a result, the rotational speed of the engine can be controlled more precisely during slow-speed cruising.

Since the slow-speed operation section is provided on the gauge for displaying prescribed measured values from the engine, the operator of a transport vehicle provided with the engine rotation control device according to this preferred embodiment can check the measured values from the engine while controlling the speed of the vehicle during slow-speed cruising. As a result, the rotational speed of the engine can be controlled more precisely during slow-speed cruising.

The reset request section is provided in the gauge, the remote control side control unit or the engine side control unit. Since the reset request section easily communicates with the reset section, the reset section can be reliably actuated when required. As a result, the rotational speed of the engine can be controlled more precisely during slow-speed cruising.

The timer monitors the output period of the rotational speed change signal, and the reset request section makes a request for reset when the output period of the rotational speed change signal monitored by the timer reaches a predetermined time period. Since the time period to be measured by the timer is controlled to be greater than an interval between periodic communications of a control signal between the remote control side control unit and the engine side control unit, a situation in which the engine rotational speed is not changed even though a command has been input into the slow-speed operation section is prevented from occurring. As a result, the rotational speed of the engine can be controlled more precisely during slow-speed cruising.

According to this preferred embodiment, the response section provided in the engine side ECU sends out a response signal for indicating the reception of a rotational speed change signal, and the reset request section actuates the reset section after receiving the response signal. Thus, the reception of the rotational speed change signal by the engine side ECU can be used as a condition for resetting the rotational speed change signal.

The response section provided in the engine side control unit sends out a response signal for indicating the reception of a rotational speed change signal, and the reset request section actuates the reset section after receiving the response signal. Thus, the reception of the rotational speed change signal by the engine side control unit can be used as a condition for resetting of the rotational speed change signal. A situation in which the engine rotational speed is not changed even though a command has been input into the slow-speed operation section is prevented from occurring. As a result, the rotational speed of the engine can be controlled more precisely during slow-speed cruising.

In the boat according to the above-described preferred embodiment, the rotational speed of the engine can be precisely controlled during slow-speed cruising without applying an excessive load on the engine side ECU.

Other features, elements, characteristics and advantages of the present invention will become more apparent from the following detailed description of preferred embodiments of the present invention with reference to the attached drawings.

DETAILED DESCRIPTION OF THE PREFERRED EMBODIMENTS

Preferred embodiments of the present invention will now be described with reference to the drawings.

FIGS. 1 to 7 show preferred embodiments of the present invention.

Figure 1:
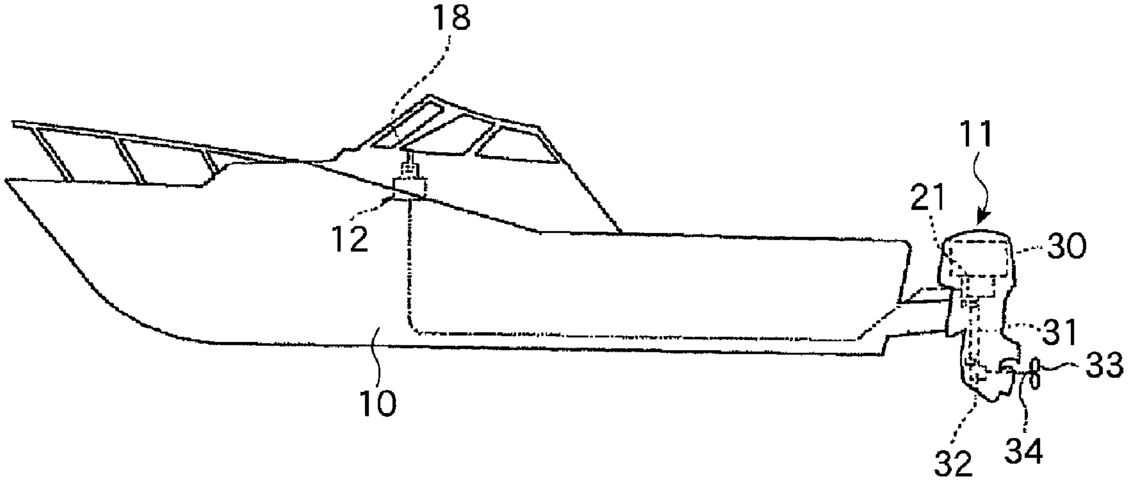
FIG. 1 is a side view of a boat according to a preferred embodiment of the present invention.
Figure 2:
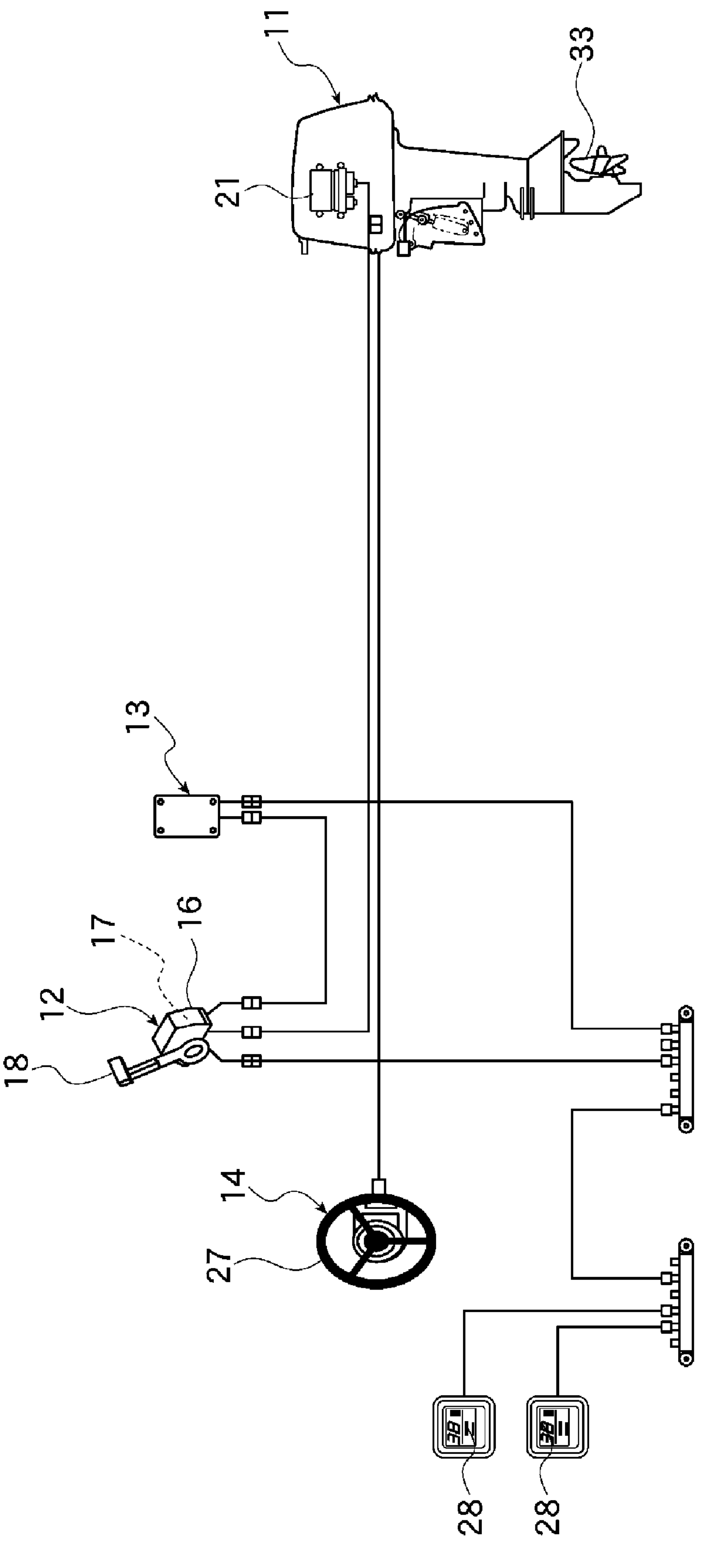
FIG. 2 is a block diagram illustrating a remote control operation device, an outboard motor and other components of the boat and how they are connected to one another according to a preferred embodiment of the present invention.

As shown in FIGS. 1 and 2, a boat according to a preferred embodiment includes an outboard motor 11 as a “boat propulsion device” attached to the stern of a hull 10. The outboard motor 11 is controlled to steer the boat by a remote control operation device 12 as a “remote control device”, a key switch device 13, and a steering wheel device 14 that are arranged in the cockpit on the hull 10.

The remote control operation device 12 includes a remote control body 16 in which a remote control side ECU 17 as a “remote control side control unit” is housed, and a remote control shift lever 18 enabling throttle and shift operations. Shift switching between forward, neutral, and reverse is remotely performed by the remote control shift lever 18. As shown in FIG. 1, the center position, at which the remote control shift lever 18 extends substantially vertically, is the neutral position (N), and a position at which the remote control shift lever 18 is tilted forward by a prescribed angle from the center position and a position at which the remote control shift lever 18 is tilted backward by a prescribed angle from the center position are the forward position (F) and the reverse position (R), respectively. The operation information including the speed at which the remote control shift lever 18 is operated and the angle through which the remote control shift lever 18 is operated is detected by a potentiometer (not shown) and transmitted to the remote control side ECU 17.

A signal from the remote control side ECU 17 is transmitted to an engine side ECU 21 as an “engine side control unit” of the outboard motor 11. The engine side ECU 21 controls the drive of the shift motor (not shown) of a shift actuator (not shown) based on the displacement of the remote control shift lever 18, and a shift switching device (not shown) is actuated by the shift actuator (not shown) to perform shift switching between forward, neutral, and reverse.

The key switch device 13 is connected to the remote control side ECU 17 of the remote control operation device 12 as shown in FIG. 2. The key switch device 13 includes a starter switch and a main/stop switch, although not shown.

The steering wheel device 14 is provided with a steering wheel side ECU (not shown) and includes a steering wheel 27 for steering the boat. The steering wheel position is detected by a position sensor, which is connected to the steering wheel side ECU via a signal circuit.

The steering wheel side ECU of the steering wheel device 14 is connected to the engine side ECU 21 of the remote control operation device 12 via a DBWCAN cable as a signal line. Here, DBW stands for Drive-By-Wire, which is a control device that uses electrical connection instead of mechanical connection, and CAN stands for "Controller Area Network."

In FIG. 2, a gauge is designated as 28. The gauge 28 includes various meters and a display device, such as an LED, that displays specific measured values from an engine 30 of the outboard motor 11, and a slow-speed operation section 281 shown in the functional block diagram of FIG. 4. The slow-speed operation section 281 includes an interface through which the operator can manually input a command. In this preferred embodiment, a push button (not shown) on the surface of the slow-speed operation section 281 of the gauge 28 is provided as an interface. When the button is pushed, a change command signal for changing the rotational speed of the engine 30 is output. In this preferred embodiment, every time the button is pushed, a change command signal is output to change a selection from control programs for slow-speed cruising stored in a ROM (not shown) of the engine side ECU 21 (the detail of which will be described below).

The engine 30 is located in an upper portion of the outboard motor 11, and the output of the engine 30 is transmitted via a drive shaft 31 and a shift device 32 to a propeller shaft 34 to which a propeller 33 is attached.

Shift switching between forward, neutral, and reverse in the shift device 32 is performed by the shift switching device (not shown), and the shift switching device (not shown) is driven by the shift actuator (not shown).

Figure 3:
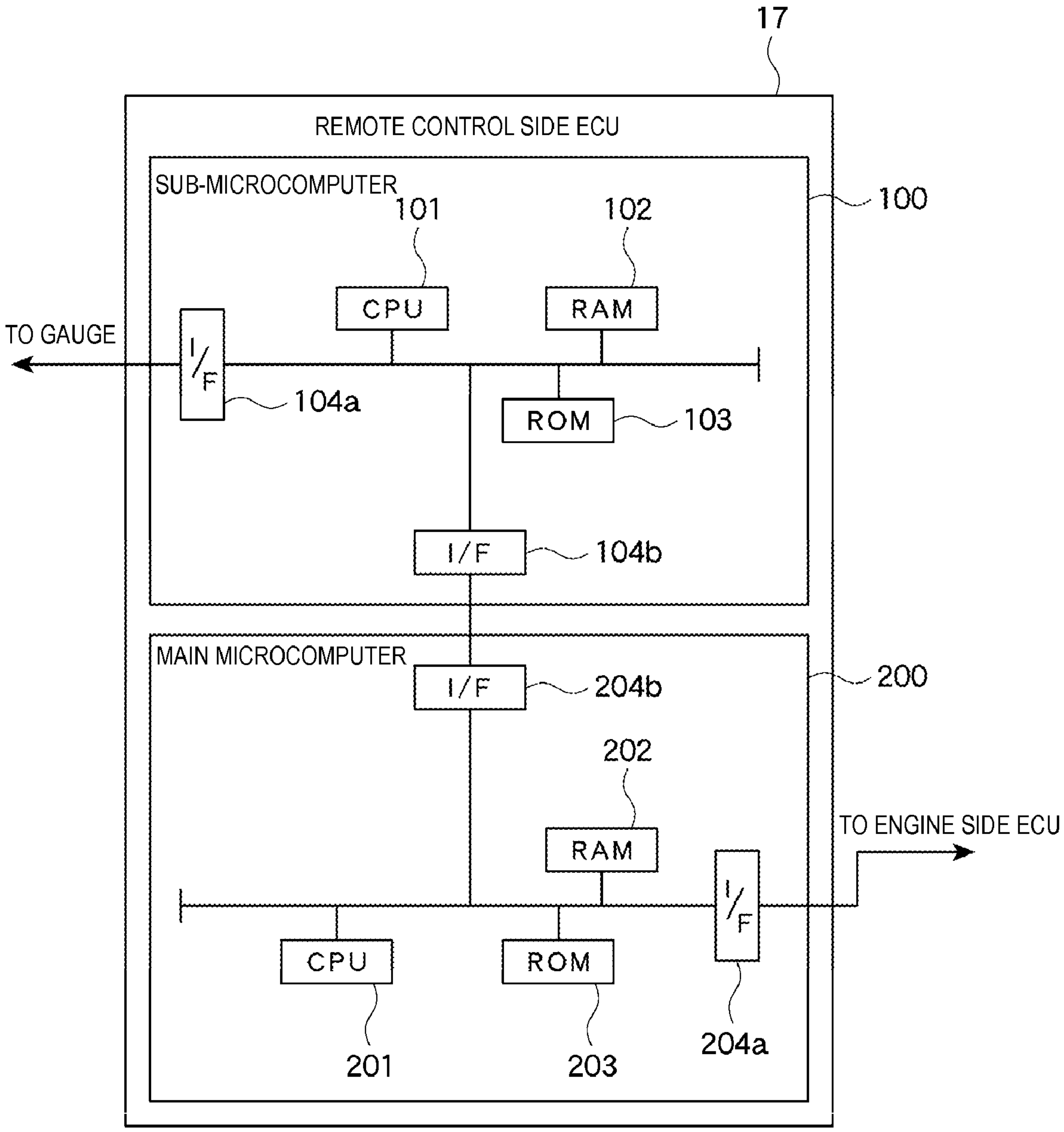
FIG. 3 is a block diagram illustrating the hardware configuration of a remote control side ECU of the boat according to a preferred embodiment of the present invention.

FIG. 3 is a hardware configuration diagram of the remote control side ECU 17. As shown in FIG. 3, the remote control side ECU 17 includes a sub-microcomputer 100 and a main microcomputer 200, and performs distributed processing depending on the nature of the operations. The sub-microcomputer 100 includes at least one CPU (Central Processing Unit) 101 which performs arithmetic processing of programs and data, a RAM (Random Access Memory) 102 which functions as a work area of the CPU 101, a ROM (Read Only Memory) 103 in which required programs and data are stored, and interfaces (I/F) 104*a* and 104*b* which perform various processing required for communicating with the gauge 28 and the main microcomputer 200. The main microcomputer 200 includes a CPU 201, a RAM 202, a ROM 203, interfaces (I/F) 204*a* and 204*b*, which have substantially the same configuration and function as those of the sub-microcomputer 100.

Figure 4:
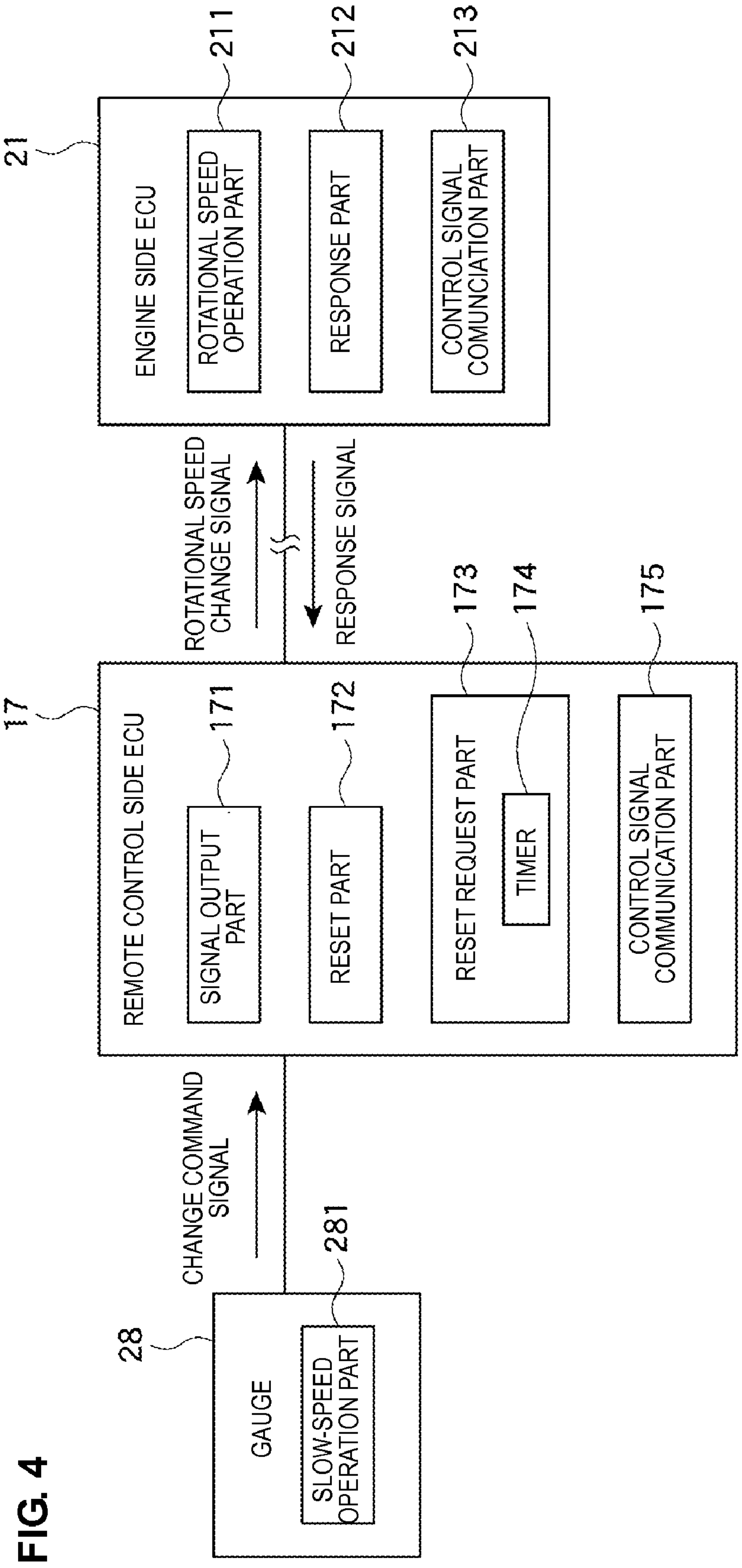
FIG. 4 is a functional block diagram of the remote control side ECU and an engine side ECU of the boat according to a preferred embodiment of the present invention.

The remote control side ECU 17 is provided with the functional units shown in the functional block diagram of FIG. 4. That is, the remote control side ECI 17 includes a signal output section 171, a reset section 172, a reset request section 173, a timer 174 provided in the reset request section 173, and a control signal communication section 175 provided by arithmetic processing of a hardware logic (not shown) or the programs stored in the ROMs 103 and 203.

Figure 6:
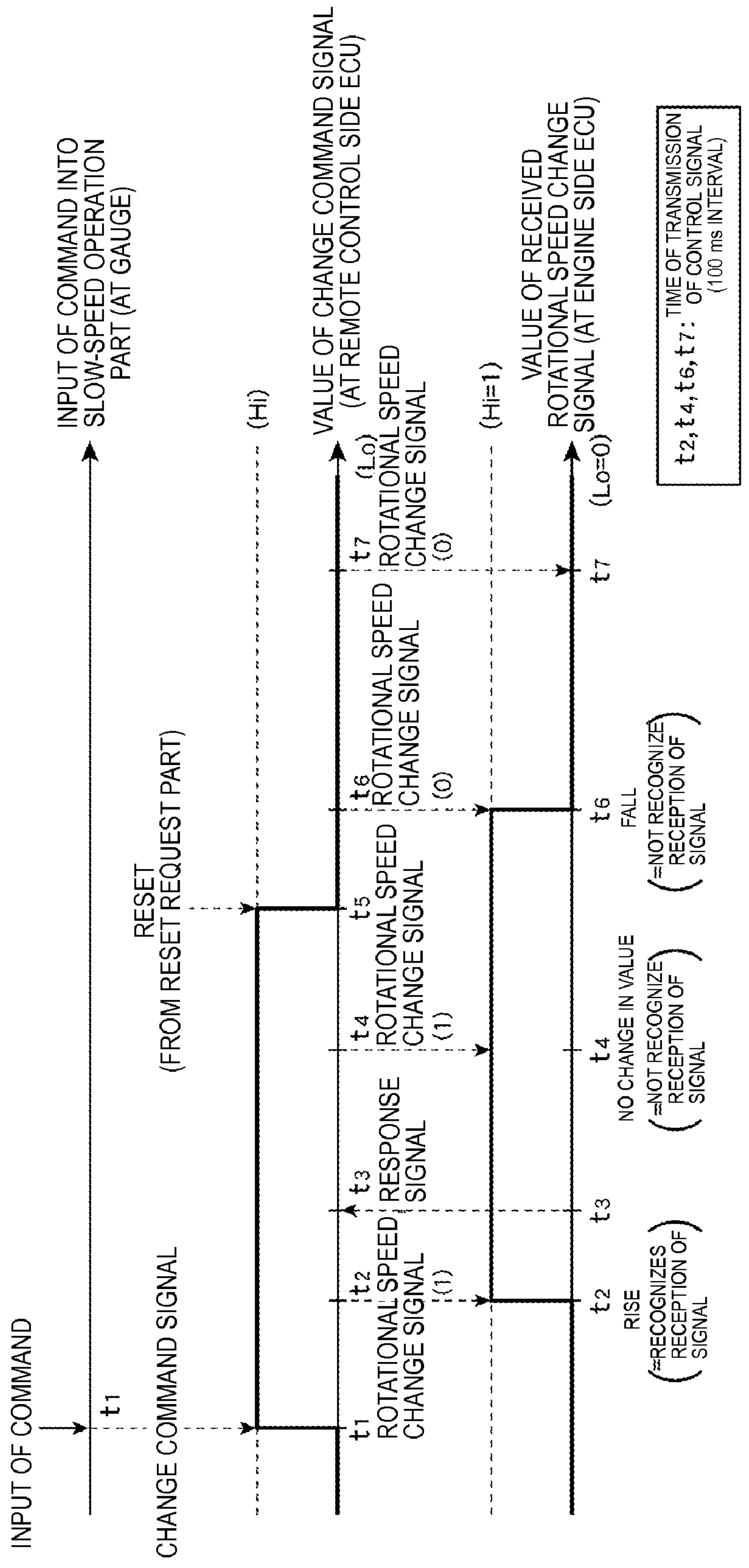
FIG. 6 is a time chart illustrating the states of operation of a gauge, the remote control side ECU and the engine side ECU of the boat according to a preferred embodiment of the present invention and communication therebetween.

The signal output section 171 receives a change command signal from the slow-speed operation section 281 of the gauge 28, and outputs a rotational speed change signal as a signal for changing the rotational speed of the engine 30. The rotational speed change signal is a signal having a binary value, an image of which is shown in FIG. 6 (see the chart of "value of received rotational speed change signal"). As show in FIG. 6, the signal value is at the low level (the value is 0) at normal times, and the signal value is shifted to the high level (value is 1) when output. The rotational speed change signal may be a value greater than a binary value so as to include a plurality of pieces of information (for example, the rotational speed change signal may be a 2-bit signal having a low level of 0 and high levels 1, 2 and 3). To achieve the reset processing based on the timing of a rise in the rotational speed operation section, which is described later, preferably only rises from a low level to a high level and falls from a high level to a low level are permitted (for example, in the above example, 0→1, 0→2, 0→3, etc. are permitted but 1→2, 1→3, etc. are not permitted).

The reset section 172 resets the output state of the rotational speed change signal to an initial state, that is, the state before the signal output section 171 receives a change command signal. The reset request section 173 performs processing required to actuate the reset section 172 (that is, to reset the rotational speed change signal). The timer 174 has a time measuring function and a function of monitoring the output period of the rotational speed change signal from the signal output section 171. The control signal communication section 175 periodically communicates a control signal at regular intervals with a control signal communication section (described later) provided in the engine side ECU 21.

Although not shown, the engine side ECU 21 also includes at least one CPU, a RAM, a ROM, and interfaces. Similar to the remote control side ECU 17, the engine side ECU 21 includes functional sections shown in the functional block diagram of FIG. 4, that is, a rotational speed operation section 211, a response section 212, and a control signal communication section 213.

The rotational speed operation section 211 receives a rotational speed change signal output from the remote control side ECU 17, and performs control functions required to change the rotational speed of the engine 30. In this preferred embodiment, although the control functions required to change the rotational speed of the engine 30 are performed when a rise of the rotational speed change signal is detected (the detail is described later), it may be performed when a fall is detected. The response section 212 sends a response signal for informing the remote control side ECU 17 of reception of the rotational speed change signal. The control signal communication section 213 periodically communicates a control signal at regular intervals with the remote control side ECU 17.

Although not shown in FIG. 4, a plurality of control programs each having a table of slow-speed cruising modes is stored in the ROM of the engine side ECU 21. One possible configuration is that each control program has a table indicating a pattern of repetition of the period for which the forward (or reverse) gear is to be used and the period for which the neutral gear is to be used (for example, mode 1: repetition of forward gear for 30 seconds and neutral gear for 10 seconds, mode 2: repetition of forward gear for 25 seconds and neutral gear for 12 seconds, etc.), and a control program with a different mode is selected every time the slow-speed operation section 281 is actuated. Alternatively, each of the control programs may not be a program having a table including specific values, but rather be a formula program used calculate the pattern of repetition of the period for which the forward (or reverse) gear is to be used and the period for which the neutral gear is to be used.

The operation of this preferred embodiment is hereinafter described.

Figure 5:
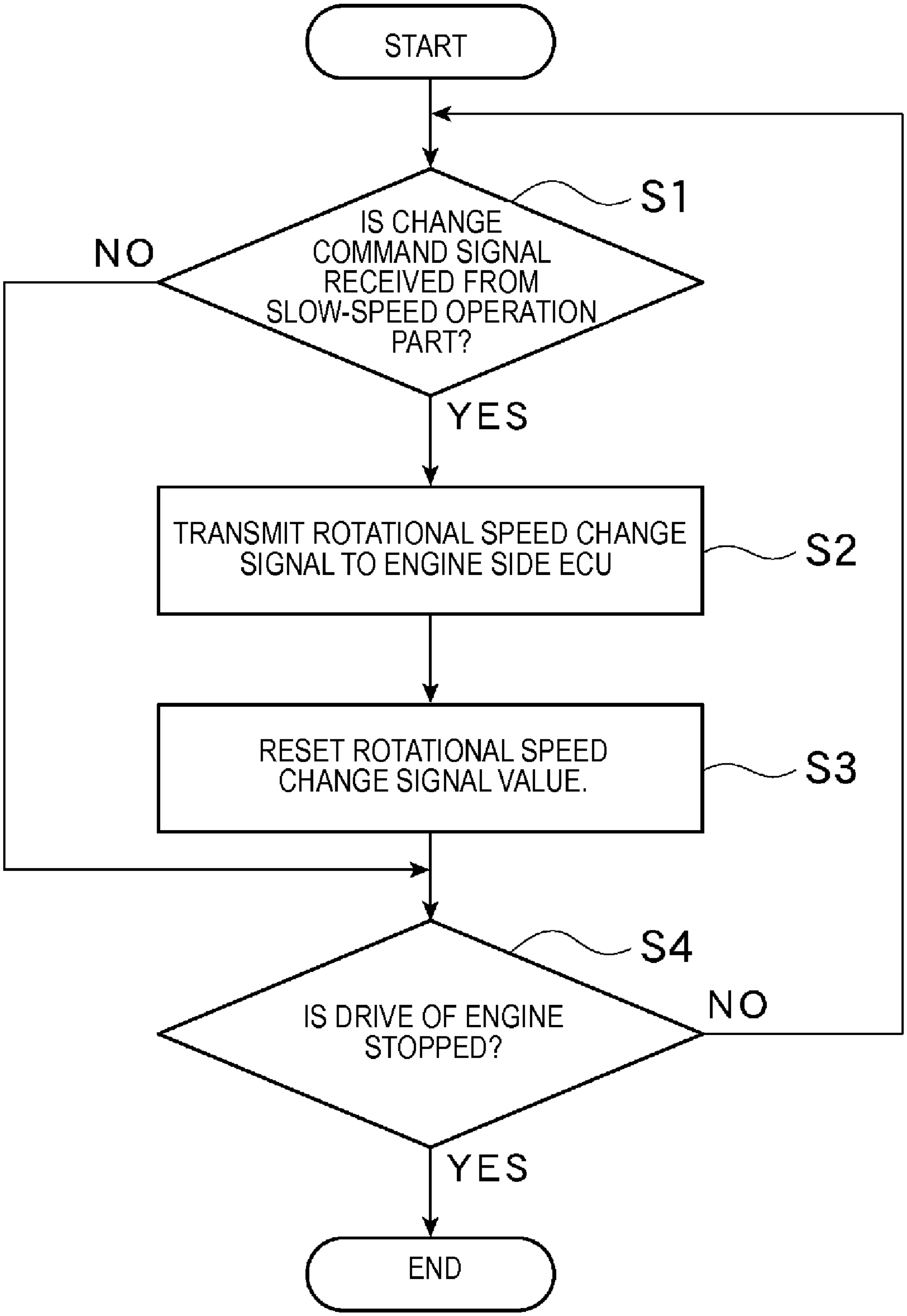
FIG. 5 is a flowchart illustrating the procedure of processing in the remote control side ECU of the boat according to a preferred embodiment of the present invention.

FIG. 5 is a flowchart illustrating the procedure of the processing which is performed in the remote control side ECU 17 of this preferred embodiment, and FIG. 6 is a time chart illustrating the states of operation of the gauge 28, the remote control side ECU 17, and the engine side ECU 21 and communication therebetween in this preferred embodiment. The processing procedure is described below with reference to the flowchart and the time chart.

When the operator pushes the button on the slow-speed operation section 281 of the gauge 28 to input a command, a change command signal is output from the slow-speed operation section 281 at the time t1 when the command is input. When the change command signal is fed to the remote control side ECU 17 ("Yes" in step S1), the change command signal reception status in the remote control side ECU 17 changes from the low level (Lo) to the high level (Hi). When the change in the change command signal reception status is detected, the signal output section 171 outputs a rotational speed change signal, which is transmitted to the engine side ECU 21 at the time t2 of a periodic communication (which is preferably performed at intervals of approximately 100 ms, for example) of a control signal between the control signal communication sections 175 and 213 (step S2). At this time, the reception status of the rotational speed change signal received in the engine side ECU 21 is changed from the low level (0) to the high level (1), and the signal reception status switches to the rise state at the moment of the change (t2).

When the rise of the rotational speed change signal is detected, the rotational speed operation section 211 recognizes reception of a rotational speed change signal and performs control functions required to change the rotational speed of the engine 30. More specifically, a control program corresponding to the rotational speed change signal is selected from the control programs stored in the ROM (not shown) of the engine side ECU 21, and the rotation of the engine 30 is controlled based on the control program.

At a specific time t3 after reception of the rotational speed change signal is recognized in the engine side ECU 21, the response section 212 sends out a response signal to indicate the reception of the rotational speed change signal. The time period from when the engine side ECU 21 receives a rotational speed change signal to when the response section 212 sends out a response signal is set in advance in the engine side ECU 21. The remote control side ECU 17 receives the response signal at the specific time t3.

As described above, since the control signal communication sections 175 and 213 periodically communicate a control signal with each other, a rotational speed change signal is transmitted from the remote control side ECU 17 to the engine side ECU 21 at a time t4 of communication of a control signal at which the change command signal reception status in the remote control side ECU 17 remains at the high level. At this time, the rotational speed change signal reception status in the engine side ECU 21 remains in the high level (1) state. Even if the state in which the rotational speed change signal remains at the high level is detected, the rotational speed operation section 211 does not recognize reception of a rotational speed change signal.

After the time t1 at which the remote control side ECU 17 received a change command signal, the timer 174 monitors the output period of the rotational speed change signal, and the reset request section 173 makes a request for reset of the rotational speed change signal at a time t5 at which the output period reaches a predetermined time period set in advance in the timer 174. When the reset request is made and when reception of the response signal (see the time t3) is recognized, the reset section 172 resets the output state of the rotational speed change signal in the signal output section 171 to the initial state (step S3). More specifically, the reset section 172 performs an operation to change the change command signal reception status from the high level (Hi) to the low level (Lo).

At a time t6 of a periodic communication of a control signal between the control signal communication sections 175 and 213 after the reset of the output state of the rotational speed change signal, the rotational speed change signal is transmitted as a low level (0) signal from the remote control side ECU 17 to the engine side ECU 21. At this time, the reception status of the rotational speed change signal received in the engine side ECU 21 changes from the high level (1) to the low level (0), and the signal reception status switches to the fall state at the moment of the change (t6). The rotational speed operation section 211 does not recognize reception of a rotational speed change signal even if the fall state is detected.

Even at a time t7 of a periodic communication of a control signal between the control signal communication sections 175 and 213 at which the rotational speed change signal remains in the low level (0) state, the rotational speed operation section 211 does not recognize reception of a rotational speed change signal.

The above-described processing procedure is not performed if a change command signal is not fed to the remote control side ECU 17 ("No" in step S1). The procedure from step S1 to step S3 is repeated until driving of the engine 30 is stopped (step S4).

Figure 7:
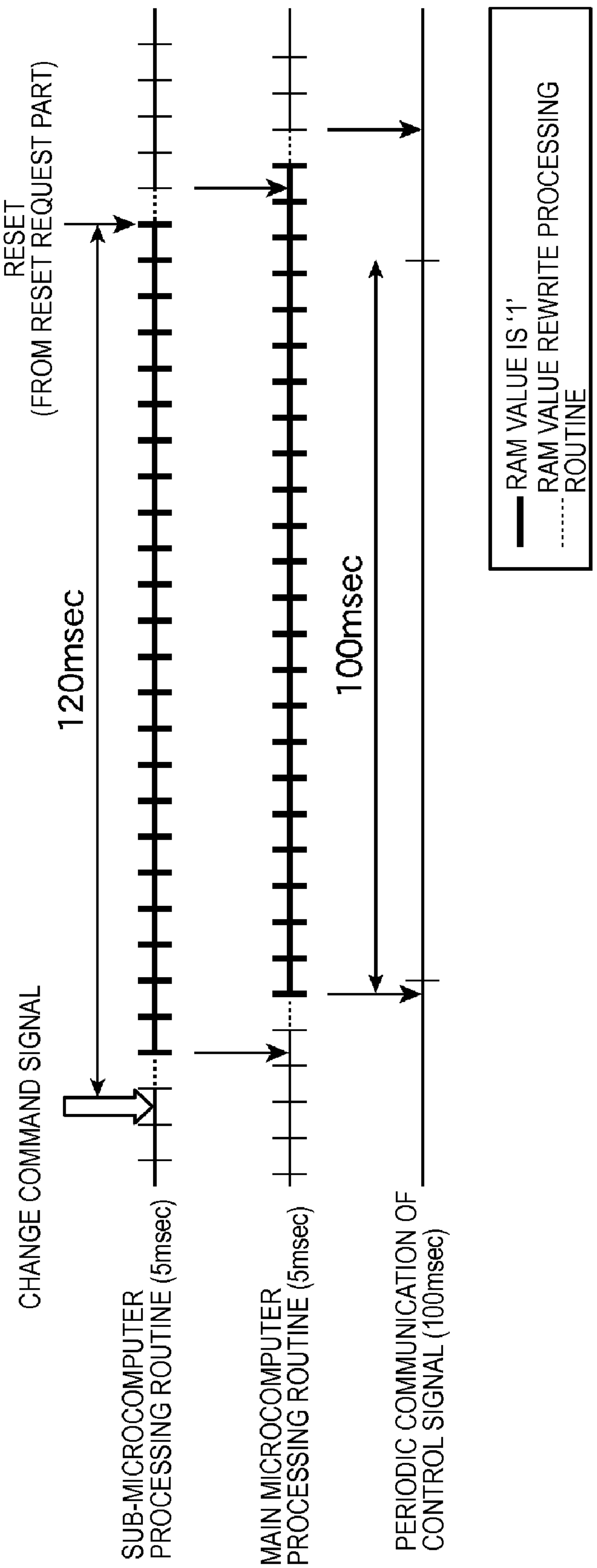
FIG. 7 is a time chart illustrating the states of operation and communication of the remote control side ECU of the boat according to a preferred embodiment of the present invention.

The setting of the time t5 of reset in step S3, that is, the time period for which the timer 174 performs monitoring is described below. FIG. 7 is a time chart illustrating the state of operation and communication of the remote control side ECU 17, and shows a series of processes from the input of a change command signal to the reset. In FIG. 7, the upper time chart shows a processing routine of the sub-microcomputer 100 of the remote control side ECU 17, the time chart in the middle shows the processing routine of the main microcomputer 200, and the lower chart shows the periodic communications of a control signal between the control signal communication sections 175 and 213. On the chart of the processing routine of the sub-microcomputer 100 and the chart of the processing routine of the main microcomputer 200, one division represents a processing unit of the routine (e.g., about 5 msec).

As shown in FIG. 3, when a (high level (Hi)) change command signal is input from the slow-speed operation section 281 of the gauge 28 to the remote control side ECU 17, the change command signal is input through the interface 104*a* into the sub-microcomputer 100. As shown in FIG. 7, one routine is required for the input change command signal to be read into the RAM 102 in the sub-microcomputer 100. When the reading of the change command signal into the RAM 102 of the sub-microcomputer 100 is completed, the change command signal is transmitted from the sub-microcomputer 100 to the main microcomputer 200 through the interfaces 104*b* and 204*b* as shown in FIG. 3. As shown in FIG. 7, it also takes one routine for the change command signal to be read into the RAM 202 in the main microcomputer 200. When the reading of the change command signal into the RAM 202 of the main microcomputer 200 is completed, the CPU 201 of the main microcomputer 200 generates a rotational speed change signal based on a program stored in the ROM 203 and transmits the rotational speed change signal to the engine side ECU 21 through the interface 204*a*.

On the other hand, when there is an operation request from the reset request section 173 to the reset section 172 and the reset section 172 is activated to provide a reset processing command, one routine is required for the reset processing (more specifically, processing of changing the change command signal from high level (Hi) to low level (Lo) is performed) to be read into the RAM 102 of the sub-microcomputer 100 as shown in FIG. 7. When the reading of the reset processing into the RAM 102 of the sub-microcomputer 100 is completed, the reset processing command is transmitted from the sub-microcomputer 100 to the main microcomputer 200 as shown in FIG. 3, and the main microcomputer 200 uses one routine to read the reset processing into the RAM 202 as shown in FIG. 7. When the reading of the reset processing into the RAM 202 is completed, the rotational speed change signal is reset from the high level (1) to the low level (0), and the rotational speed change signal is transmitted as a low level (0) signal from the remote control side ECU 17 to the engine side ECU 21 at the time of the next periodic communication of a control signal between the control signal communication sections 175 and 213.

That is, in this preferred embodiment, "time α": the time period from when the remote control side ECU 17 receives a change command signal to when the RAM 102 of the sub-microcomputer 100 starts reading of the change command signal (shorter than one routine), "time β": the time period required for the change command signal to be read into the RAM 102 of the sub-microcomputer 100 (one routine), "time γ": the time period from when the reset processing command is transmitted from the sub-microcomputer 100 to the main microcomputer 200 and to when the RAM 202 of the main microcomputer 200 starts reading it (shorter than one routine), and "time Δ": the period of time required for the reset processing to be read into the RAM 202 of the main microcomputer 200 (one routine) should be taken into account in addition to the durations of the change command signal and the rotational speed change signal themselves. If the duration of the change command signal and the interval between periodic communications of a control signal between the control signal communication sections 175 and 213 are substantially equal to each other, a situation may occur in which the rotational speed change signal cannot be properly transmitted to the engine side ECU 21 through a periodic communication of a control signal between the control signal communication sections 175 and 213 because of the time lag produced by the "time α" to "time Δ," and the engine rotational speed is not changed even though the operator has pushed the button on the slow-speed operation section 281. That is, the above situation may occur when the time period from the time t1, at which the remote control side ECU 17 receives a change command signal, to the time t5, at which the reset request section 173 makes a request for reset of the rotational speed change signal, is equal to or less than "the interval between periodic communications of a control signal between the control signal communication sections 175 and 213 (100 msec)+time α (less than 5 msec)+time β (5 msec)+time γ (less than 5 msec)+time Δ (5 msec)" . . . (A)

To prevent this situation from occurring, in this preferred embodiment, the time period from the time t1, at which the remote control side ECU 17 receives a change command signal, to the time t5, at which the reset request section 173 makes a request for reset of the rotational speed change signal to be set in the timer 174 is set to a value of about 120 msec, for example, which is longer than the above time period (A), or greater. Therefore, a situation in which the engine rotational speed is not changed even though the operator has pushed the button on the slow-speed operation section 281 is prevented from occurring.

As described above, in this preferred embodiment, the remote control operation device 12 that remotely controls the engine 30 is provided with the remote control side ECU 17 that outputs a rotational speed change signal when a change command signal fed from the slow-speed operation section 281 is received. In addition, the control signal communication section 175 of the remote control side ECU 17 and the control signal communication section 213 of the engine side ECU 21 periodically communicate a control signal with each other at regular intervals, and the rotational speed operation section 211 of the engine side ECU 21 changes the rotational speed of the engine 30 based on the rotational speed change signal. Therefore, when the rotational speed of the engine 30 is remotely controlled, since the signal processing during slow-speed cruising is first performed on the remote control side ECU 17 side, the load on the engine side ECU 21 is reduced. In addition, since the remote control side ECU 17 includes the signal output section 171 that outputs a rotational speed change signal and the reset section 172 that resets the output state of the rotational speed change signal in the signal output section 171 to an initial state, and since the reset request section 173 that activates the reset section 172 is also provided, the output and reset of the rotational speed change signal is properly controlled in time with a periodic communication of a control signal between the remote control side ECU 17 and the engine side ECU 21.

According to this preferred embodiment, the rotational speed operation section 211 of the engine side ECU 21 performs control functions required to change the rotational speed of the engine 30 when a rise of the rotational speed change signal is detected. Thus, the rotational speed operation section 211 performs the control functions required to change the rotational speed of the engine 30 only at a time when the rotational speed change signal fed from the remote control side ECU 17 is changed. Therefore, even when the output period of one change command signal extends across a plurality of intervals between periodic communications of a control signal between the remote control side ECU 17 and the engine side ECU 21, a situation in which the rotational speed operation section 211 incorrectly interprets one change command signal as a plurality of change command signals is prevented from occurring.

According to this preferred embodiment, the slow-speed operation section 281 is provided on the gauge 28 so as to display prescribed measured values from the engine 30. Thus, the operator of the boat according to this preferred embodiment can check the measured values from the engine 30 while controlling the boat speed during slow-speed cruising.

According to this preferred embodiment, the reset request section 173 is provided in the remote control side control unit 17. Since the reset request section 173 can easily communicate with the reset section 172, the reset section 172 can be reliably actuated when required.

According to this preferred embodiment, the timer 174 monitors the output period of the rotational speed change signal, and the reset request section 173 makes a request for reset when the output period of the rotational speed change signal monitored by the timer 174 reaches a predetermined time period. Since the time period to be measured by the timer 174 is controlled to be greater than an interval between periodic communications of a control signal between the remote control side ECU 17 and the engine side ECU 21, a situation in which the engine rotational speed is not changed even though a command has been inputted into the slow-speed operation section 281 is prevented from occurring.

According to this preferred embodiment, the response section 212 provided in the engine side ECU 21 sends out a response signal to indicate reception of a rotational speed change signal, and the reset request section 173 actuates the reset section 172 after receiving the response signal. Thus, the reception of the rotational speed change signal by the engine side ECU 21 can be used as a condition for resetting the rotational speed change signal. Therefore, a situation in which the engine rotational speed is not changed even though a command has been inputted into the slow-speed operation section 281 is prevented from occurring.

Although the outboard motor 11 is used as the "boat propulsion device" in the above-described preferred embodiment, the "boat propulsion device" may be an inboard-outboard motor or any other suitable motor.

Although the slow-speed operation section 281 is provided on the gauge 28 in the above-described preferred embodiment, the present invention is not limited thereto. For example, a "slow-speed operation unit" may be provided on the steering wheel device 14, in a portion of the remote control operation device 12, in a portion of the remote control shift lever 18, or in a portion of the outboard motor 11.

Although the reset request section 173 is provided in the remote control side ECU 17 in the above-described preferred embodiment, the present invention is not limited thereto. A reset request section may be provided in the gauge 28 or the engine side ECU 21. The reset request section may be provided in a component other than the gauge 28 and the engine side ECU 21 which can communicate with the reset section 172 easily so that the reset section 172 can be reliably activated when required.

Although the response section 212 is provided in the engine side ECU 21, and the response indicating the reception of the rotational speed change signal from the response section 212 to the remote control side ECU 17 side is used as a condition to reset the rotational speed change signal in the above-described preferred embodiment, the response section 212 may not be provided and the response indicating the reception of the rotational speed change signal from the response section 212 to the remote control side ECU 17 side may be omitted for simplification and increased speed of the processing.

Although the engine rotation control device is provided in a boat in the above-described preferred embodiment, the present invention is not limited thereto. The present invention is applicable to any machines having an internal combustion engine, such as automobiles, aircrafts, locomotives, and power generators.

The above-described preferred embodiments are illustrative only and is not intended to limit the present invention to the above-described preferred embodiment.

While preferred embodiments of the invention have been described above, it is to be understood that variations and modifications will be apparent to those skilled in the art without departing from the scope and spirit of the invention. The scope of the invention, therefore, is to be determined solely by the following claims.

What is claimed is:

1. An engine rotation control device comprising:

a slow-speed operation section that outputs a change command signal to change a rotational speed of an engine based on a command input to control the speed during slow-speed cruising;

a remote control side control unit provided in a remote control device that remotely controls the engine so as to output a rotational speed change signal to change the rotational speed of the engine when the change command signal is received; and an engine side control unit provided in the engine that periodically communicates a control signal with the remote control side control unit at regular intervals to change the rotational speed of the engine based on the rotational speed change signal; wherein the remote control side control unit includes a signal output section that outputs the rotational speed change signal, a reset section that resets the output state of the rotational speed change signal in the signal output unit to an initial state, and a reset request section that actuates the reset section.

2. The engine rotation control device according to claim 1, wherein the engine side control unit includes a rotational speed operation section that performs control functions required to change the rotational speed of the engine when a rise or fall of the rotational speed change signal is detected.

3. The engine rotation control device according to claim 1, wherein the slow-speed operation section is provided on a gauge to display measured values from the engine.

4. The engine rotation control device according to claim 1, wherein the reset request section is provided in one of the gauge, the remote control side control unit, and the engine side control unit.

5. The engine rotation control device according to claim 1, wherein the reset request section includes a timer arranged to monitor the output period of the rotational speed change signal, and the reset request section makes a request for the reset when the output period of the rotational speed change signal measured by the timer reaches a predetermined period of time.

6. The engine rotation control device according to claim 1, wherein the engine side control unit includes a response section that sends out a response signal for indicating the reception of the rotational speed change signal, and the reset request section activates the reset section after receiving the response signal.

7. The engine rotation control device according to claim 1, wherein the slow-speed operation section includes an interface through which an operator can manually input a command.

8. The engine rotation control device according to claim 1, wherein the remote control side control unit includes a sub-microcomputer and a main microcomputer which communicate with one another.

9. The engine rotation control device according to claim 8, wherein the sub-microcomputer includes at least one CPU which performs arithmetic processing of programs and data, a RAM which functions as a work area of the at least one CPU, a ROM in which required programs and data are stored, and a plurality of interfaces which perform various processing required for communicating with the gauge and the main microcomputer.

10. The engine rotation control device according to claim 8, wherein the main microcomputer includes at least one CPU which performs arithmetic processing of programs and data, a RAM which functions as a work area of the at least one CPU, a ROM in which required programs and data are stored, and a plurality of interfaces which perform various processing required for communicating with the engine side control unit and the sub-microcomputer.

11. The engine rotation control device according to claim 1, wherein the rotation speed change signal is a signal having a binary value.

12. A boat comprising:

a hull;

a boat propulsion device attached to a stern of the hull and including an engine; and an engine rotation control device according to claim 1.

* * * * *